March 15, 1949.  F. HARTLEY  2,464,504
INTAKE MANIFOLD
Filed Dec. 22, 1945
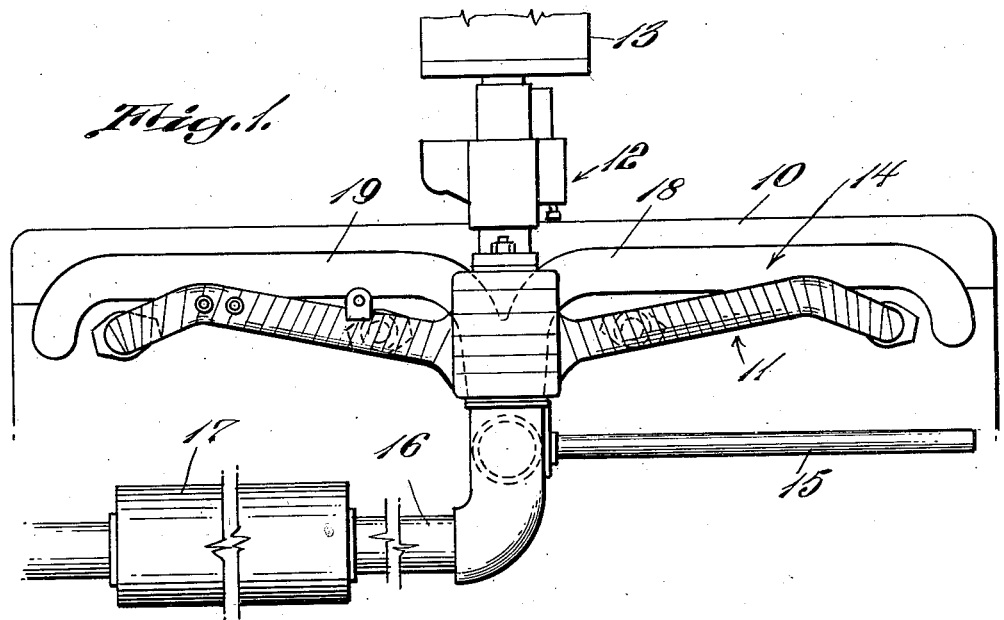
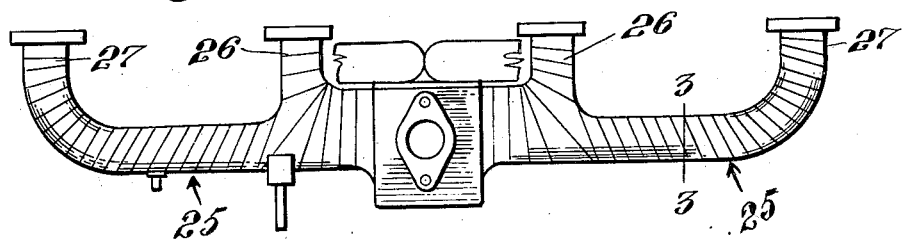
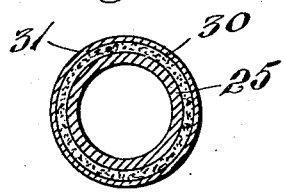 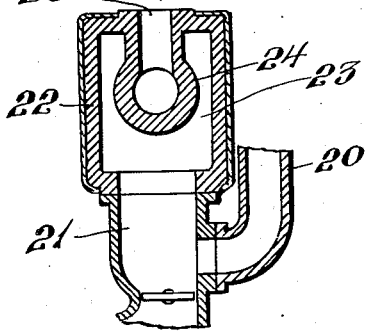
INVENTOR
Frederick Hartley
BY Barlow & Barlow
ATTORNEYS Patented Mar. 15, 1949

2,464,504

UNITED STATES PATENT OFFICE 2,464,504

INTAKE MANIFOLD

Frederick Hartley, Farnumville, Mass.

Application December 22, 1945, Serial No. 636,866

1 Claim. (Cl. 123—52)

This invention relates to an internal combustion gasoline engine and more particularly to the handling of the fuel mixture.

In the operation of an internal combustion gasoline engine, gasoline and air are mixed together in the carburetor and conveyed from the carburetor to each of the cylinders through an intake manifold. Some means are provided adjacent the carburetor for heating the manifold but as the manifold extends from this central point of intake for transfer of the gases to the various cylinders, the manifold may change in temperature or lose heat which has been acquired and thus the gases which are conveyed through the manifold may change in gaseous characteristics or condensation of the gasoline may occur.

One of the objects of this invention is to provide an arrangement so that the fuel gases after mixing and heating will be maintained in substantially their state of mixture and heating without condensation or change.

Another object of this invention is to provide a manifold which will maintain heat which it acquires and transfers along its length for the better conditioning of the fuel mixture as it passes through the manifold.

A more specific object of this invention is to insulate the manifold from the cooler air to which it is subjected so that the heat acquired by this manifold will be maintained by the manifold for a longer period of time and the heat of the manifold will rise to a temperature higher than that usually found in manifolds not provided with this heat insulation.

A more specific object of this invention is to coat the manifold with some heat insulating material throughout its length.

With these and other objects in view, the invention consists of certain novel features of construction, as will be more fully described and particularly pointed out in the appened claim.

In the accompanying drawings:

Fig. 1 is a side elevation illustrating the intake manifold and parts of an engine with which the manifold is associated, the view being largely diagrammatic;

Fig. 2 is a top plan view of the manifold;

Fig. 3 is a section on line 3—3 of Fig. 2;

Fig. 4 is a section substantially centrally of the manifold and illustrating parts of the exhaust manifold as associated therewith.

In proceeding with this invention, I provide an insulating covering over the intake manifold of an internal combustion gasoline engine, this covering being of some non-combustible material such as asbestos, which may be applied by molding or in part sections or by wrapping narrow strips of the material about the same.

With reference to the drawings, I show an internal combustion gas engine block 10 which is provided with an intake manifold designated generally 11 and a carburetor 12 which receives air from the strainer 13 above the carburetor. An exhaust manifold 14 is also provided for the engine block while another air intake is designated 15 and a muffler pipe 16 extends to a muffler 17.

The exhaust manifold designated generally 14 consists of a portion 18 and a portion 19 which come together to provide a common conduit 20 which leads into a chamber 21 from which the exhaust conduit 16 extends to the muffler. A thermostatic valve usually controls this chamber which is connected to the air inlet pipe 15. This chamber 21 communicates with the rectangular chamber 22 of the intake manifold 11, so as to provide a heating chamber 23 about the central portion 24 of this intake manifold which extends in either direction into arms 25 from which branch arms 26 and 27 extend with openings at their ends to conduct gases to each of the different cylinders. The central portion 24 of this manifold is open as at 28 to receive the mixed fuel gases from the carburetor 12.

In order to retain the heat acquired in the portion 24 of this intake manifold, which heat is conveyed by conduction to the arms 25, I have provided a heat insulating cover 30 extending throughout the length of the arms 25 and also over the chamber 22. This heat insulating cover may consist of some sort of loose or molded heat insulating fibrous material, such as asbestos, placed over the arms 25 and conforming to their shape. Any suitable means secures this in place such as by a winding 31 of narrow strips of asbestos sheet material helically about the arms 25 and chamber 22 to extend the entire length of the manifold and provide a covering which will be strong enough to retain its position on the manifold while in use. If this covering is dampened somewhat with water it may be very readily molded into the desired shape. This covering retains the heat acquired by the manifold and affords a better fuel gaseous condition and increased mileage for automobile operation.

I claim:

A manifold for the fuel supply of an internal combustion gas engine comprising a tubular conduit provided with outlet openings at spaced intervals and a covering of fibrous heat insulating material over the outer surface of said conduit, and a strip of sheet insulating material wound in helical form about said fibrous material to hold the same in place.

FREDERICK HARTLEY.

REFERENCES CITED

The following references are of record in the file of this patent:

UNITED STATES PATENTS

| Number | Name | Date |
|---|---|---|
| 858,046 | Westendarp | June 25, 1907 |
| 934,599 | Flint | Sept. 21, 1909 |
| 2,054,997 | Vang | Sept. 22, 1936 |
| 2,261,446 | Ormsby | Nov. 4, 1941 |